United States Patent
Cooper et al.

(10) Patent No.: US 7,290,620 B2
(45) Date of Patent: Nov. 6, 2007

(54) DISK BLADE SCRAPERS FOR TILLAGE APPARATUS

(75) Inventors: Troy L. Cooper, Goodfield, IL (US); Marvin D. Kuebler, Goodfield, IL (US); Rickey L. Gerber, Roanoke, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/788,624

(22) Filed: Feb. 27, 2004

(65) Prior Publication Data

US 2005/0189126 A1 Sep. 1, 2005

(51) Int. Cl.
*A01B 15/16* (2006.01)

(52) U.S. Cl. .................... 172/559; 15/256.5
(58) Field of Classification Search ............. 172/558, 172/559; 15/256.5
See application file for complete search history.

(56) References Cited

U.S. PATENT DOCUMENTS

| | | | | |
|---|---|---|---|---|
| 358,246 | A | * 2/1887 | Arnett | .................. 172/604 |
| 377,213 | A | 1/1888 | Ritty | |
| 523,508 | A | * 7/1894 | Bauer et al. | .................. 172/559 |
| 662,981 | A | 12/1900 | Sims | |
| 663,436 | A | 12/1900 | Heylman | |
| 785,865 | A | * 3/1905 | Davis | .................. 172/559 |
| 808,021 | A | * 12/1905 | Davis | .................. 172/559 |
| 831,505 | A | 9/1906 | Gaylord | |
| 856,033 | A | 6/1907 | Crisler | |
| 935,680 | A | 10/1909 | Niesz | |
| 1,017,318 | A | 1/1912 | Rieske | |
| 1,096,478 | A | * 5/1914 | Weller | .................. 172/559 |
| 1,160,638 | A | 11/1915 | Miller | |
| 1,168,594 | A | * 1/1916 | Berendes | .................. 172/166 |
| 1,204,306 | A | 11/1916 | Offerman | |
| 1,220,014 | A | 3/1917 | Sherwin | |
| 1,260,752 | A | 3/1918 | Casaday | |
| 1,321,040 | A | 11/1919 | Hoffman | |
| 1,391,593 | A | * 9/1921 | Sweeting | .................. 172/187 |
| 1,410,813 | A | 3/1922 | Kammever | |
| 1,472,209 | A | 10/1923 | Dewend | |
| 1,663,239 | A | * 3/1928 | Bucknam | .................. 172/604 |
| 1,791,462 | A | 2/1931 | Bermel | |
| 1,819,292 | A | 8/1931 | Hendricks | |
| 1,982,157 | A | 11/1934 | Gandrup et al. | |
| 2,353,790 | A | 7/1944 | Seaholm | |
| 2,805,534 | A | 9/1957 | Robertson | |

(Continued)

*Primary Examiner*—Thomas B. Will
*Assistant Examiner*—Jamie L McGowan
(74) *Attorney, Agent, or Firm*—Rebecca Henkel

(57) ABSTRACT

A disk blade scraper is used with a tillage implement having rotating disk blades separated by hub spools. In one form, the disk blade scraper has a wide tapered scraper blade positioned very close to the transition of the hub spool and the disk blade. In another form, the disk blade scraper incorporates a round disk having an edge that runs in the transition joint of the disk blade and the hub spool. In yet another form, the disk blade scraper incorporates a round and or square bar that is positioned in such a way that the bar end rubs against this transition joint. In still another form, the disk blade scraper incorporates a flat scraper blade shaped to fit the contour of the backside of the disk blade. The corner of this scraper is positioned very close to the transition joint of the disk blade and the hub spool.

6 Claims, 4 Drawing Sheets

U.S. PATENT DOCUMENTS

| | | |
|---|---|---|
| 2,901,049 A | 8/1959 | De Haai |
| 3,139,938 A | 7/1964 | Parrish et al. |
| 3,261,411 A * | 7/1966 | Youngberg et al. ......... 172/559 |
| 3,438,448 A | 4/1969 | Richey et al. |
| 3,833,067 A | 9/1974 | Peterson, Jr. et al. |
| 4,008,770 A | 2/1977 | Boone et al. |
| 4,034,688 A | 7/1977 | Ernst |
| 4,127,179 A | 11/1978 | Heersink et al. |
| 4,206,817 A | 6/1980 | Bowerman |
| 4,245,706 A | 1/1981 | Dietrich, Sr. |
| 4,330,041 A | 5/1982 | Ankenman |
| 4,333,535 A | 6/1982 | Hentrich, Sr. |
| 4,603,746 A | 8/1986 | Swales |
| 4,669,550 A * | 6/1987 | Sittre ......................... 172/559 |
| 5,267,619 A | 12/1993 | Eversole |
| 6,557,646 B1 | 5/2003 | Hurtis et al. |

\* cited by examiner

DISK BLADE SCRAPERS FOR TILLAGE APPARATUS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates to an agricultural tillage apparatus including disk blades. More particularly, the invention pertains to disk blade cleaners and techniques of keeping disk blades and hub spools clean of dirt/residue buildup on both sides of the disk blade.

2. Description of the Related Art

Agricultural tillage systems including disk blades are widely used. One form of disk blade that is used in tillage systems takes the shape of a dish or bowl. It is used both for cutting trash and for throwing some of the top soil to the side. Typically, a plurality of disk blades are arranged at a relatively close spacing, and they may be mounted on a common shaft with hub spools between adjacent disk blades. When a gang of disk blades is pulled across a field, the soil is tilled, the trash is cut up, mixed with the top soil and some trash is buried. In these devices, to reduce the effect of lateral soil displacement due to complete workage, a second line or gang of disks, facing the other direction, may be placed behind a first line. Other implements also use disk blades, such as listers and bedders.

It is known to use disk blade scrapers to keep the disk blade and hub spools clean of dirt/residue buildup on both sides of disk blade. Current disk blade scrapers only scrape a small area of the concavity of the disk blade and are unable to provide superior blade cleaning performance in all or any one-soil condition. Current scrapers clean the side of the blade; however, under wet sandy loam soils, dirt starts at hub spool/blade transition joint and builds in the corner and continues to build up until dirt fills the total area except where the scraper is located. This may cause the disk blade to ride out of soil.

Therefore, there is a need for a disk blade scraper that provides superior blade cleaning capabilities during field tillage operation in any type of soil conditions. In particular, there is a need for a disk blade scraper that keeps the disk blade and hub spool area from building up with dirt/residue such that the disk blade is kept clean from the disk blade and hub spool area on out to the cutting edge of the disk blade.

SUMMARY OF THE INVENTION

The foregoing needs are met by a disk blade scraper according to the invention. The disk blade scraper is used with a tillage implement having a frame, a horizontal shaft suspended from the frame, and a plurality of rotating disk blades arranged in laterally spaced relationship on the shaft. In the tillage implement, a hub spool surrounds the horizontal shaft between at least a pair of adjacent disk blades. A first end of the hub spool contacts one of the pair of adjacent disk blades thereby creating a transition joint between the first end of the hub spool and a surface of the one of the pair of adjacent disk blades. In one version of the tillage implement, one of the surfaces of each disk blade is concave and the other surface is convex, and an annular depression is formed in a region of the concave surface surrounding the transition joint.

In one form, the disk blade scraper includes a bracket connected to the tillage implement frame, and a rotating disk mounted to the bracket. The rotating disk has an axis of rotation and a circumferential edge parallel to the axis of rotation. The bracket is connected to the frame and the rotating disk is mounted to the bracket such that the circumferential edge of the rotating disk is adjacent the transition joint between the first end of the hub spool and a surface of the one of the pair of adjacent disk blades. By way of the rotating disk, the disk blade is kept clean from the disk blade and hub spool area on out to the cutting edge of the disk blade. The circumferential edge of the rotating disk may contact the transition joint or may be spaced 0.4 inches or less from the transition joint. Preferably, an uppermost edge of the rotating disk does not extend above an uppermost edge of an adjacent disk blade, and an outermost edge of the rotating disk does not extend beyond an outermost edge of an adjacent disk blade. In a disk blade with an annular depression in the region of the concave surface surrounding the transition joint, the circumferential edge of the rotating disk may be located within the depression.

In another form, the disk blade scraper includes a bracket connected to the tillage implement frame, and an elongated bar mounted to the bracket. The bar has a longitudinal axis and a scraping surface at an end of the bar farthest from the bracket. The bracket is connected to the frame and the bar is mounted to the bracket such that the scraping surface is adjacent the transition joint between the first end of the hub spool and a surface of the one of the pair of adjacent disk blades. When the bar is mounted to the bracket, an imaginary straight line including the longitudinal axis of the bar would intersect the hub spool if the imaginary straight line were extended beyond the end of the bar. The scraping surface may contact the transition joint, or may be 0.4 inches or less from the transition joint. By way of the bar, the disk blade is kept clean from the disk blade and hub spool area on out to the cutting edge of the disk blade. The bar may have various cross-sectional shapes including, without limitation, a circular cross-section and a square cross-section. The scraping surface of the bar has at least a portion at an angle with respect to the longitudinal axis of the bar. In one configuration, the scraping surface is a flat surface perpendicular to the longitudinal axis of the bar. In another configuration, the scraping surface is a domed surface. In a disk blade with an annular depression in the region of the concave surface surrounding the transition joint, the scraping surface of the bar may be located within the depression. A second elongated bar may be mounted to the bracket. The second bar has a scraping surface at an end of the second bar farthest from the bracket. A second transition joint is formed between a second end of the hub spool and a surface of the other of the pair of adjacent disk blades, and the bracket is connected to the frame and the second bar is mounted to the bracket such that the scraping surface of the second bar is adjacent to or contacts the second transition joint.

In yet another form, the disk blade scraper includes a bracket connected to the frame, and an integral scraper blade mounted to the bracket. The scraper blade has a first end adjacent the mounting bracket, and a first side and a second opposed side extending downwardly from the first end. The first side is shorter than the second side. There is an opposite scraping end extending between the first side and the second side, and the scraping end and the second side of the scraper blade meet at a junction point. The bracket is connected to the frame and the scraper blade is mounted to the bracket such that the shorter first side of the scraper blade is further from the hub spool than the second side of the scraper blade, and the junction point is adjacent the transition joint. By way of the scraper blade, the disk blade is kept clean from the disk blade and hub spool area on out to the cutting edge of the disk blade. Preferably, the scraping end of the scraper blade has a thickness in a direction normal to an outer surface of the scraper blade not exceeding a cross-sectional thickness of the first end in the same direction. The scraper blade maybe flat and the scraping end of the scraper blade may have a tapered or curved edge. The junction point of the scraper blade may contact the transition joint, or may be 0.4 inches or less from the transition joint. The scraping end of the scraper blade contacts the surface of the one of the pair of adjacent disk blades, or may be 0.4 inches or less from one of the pair of adjacent disk blades. In a disk blade with an annular depression in the concave surface, the scraping end of the scraper blade may be located within the depression.

In still another form, the disk blade scraper includes a bracket connected to the tillage implement frame, and a scraper blade mounted to the bracket. The scraper blade has a first end, a second end opposite the first end, and a first side and a second opposed side extending downwardly from the first end. The second side includes a scraping surface, and the second side meets the second end at a junction point of the scraper blade. This form of the disk blade scraper is used on a convex disk blade surface. The scraper blade may be flat and rectangular. The bracket is connected to the frame and the scraper blade is mounted to the bracket such that all of the scraper blade is positioned above the hub spool, the scraping surface is positioned adjacent the convex surface, and the junction point is adjacent the transition joint between the hub spool and the convex disk blade surface. By way of the scraper blade, the disk blade is kept clean from the disk blade and hub spool area on out to the cutting edge of the disk blade. Preferably, the scraper blade is positioned on both sides of a vertical normal line to a center axis of the hub spool. The scraping surface is typically positioned behind the center axis of the hub spool in relation to a direction of movement of the tillage implement. The scraping surface contacts the convex surface. The junction point of the scraper blade is typically 0.4 inches or less from the transition joint between the hub spool and the convex disk blade surface.

In yet another form, the disk blade scraper includes a bracket connected to the frame, and a scraper blade mounted to the bracket. The scraper blade has a first end, a second bottom end opposite the first end, and a first side and a second opposed side extending downwardly from the first end. The second side includes a scraping surface, and the second side meets the second end at a junction point. In this form of the disk blade scraper, the surface of the one of the pair of adjacent disk blades is convex, and the bracket is connected to the frame and the scraper blade is mounted to the bracket such that scraping surface is positioned in contact with the convex surface, and the junction point is adjacent the transition joint. The scraping surface has an inwardly curved edge that contacts the convex surface. Preferably, the scraping surface has a second inwardly curved edge that contacts a crimp on the convex surface adjacent the transition joint. Preferably, at least a portion of the scraping surface is positioned behind the center axis of the hub spool in relation to a direction of movement of the tillage implement.

It is therefore an advantage of the present invention to provide a disk blade scraper that provides superior blade cleaning capabilities during field tillage operation in any type of soil conditions.

It is another advantage of the present invention to provide a disk blade scraper that keeps the disk blade and hub spool area from building up with dirt/residue such that the disk blade is kept clean from the disk blade and hub spool area on out to the cutting edge of the disk blade.

These and other features, aspects, and advantages of the present invention will become better understood upon consideration of the following detailed description, drawings, and appended claims.

BRIEF DESCRIPTION OF THE DRAWINGS

Like reference numerals are used to depict like parts throughout the Figures.

DETAILED DESCRIPTION OF THE INVENTION

Figure 1:
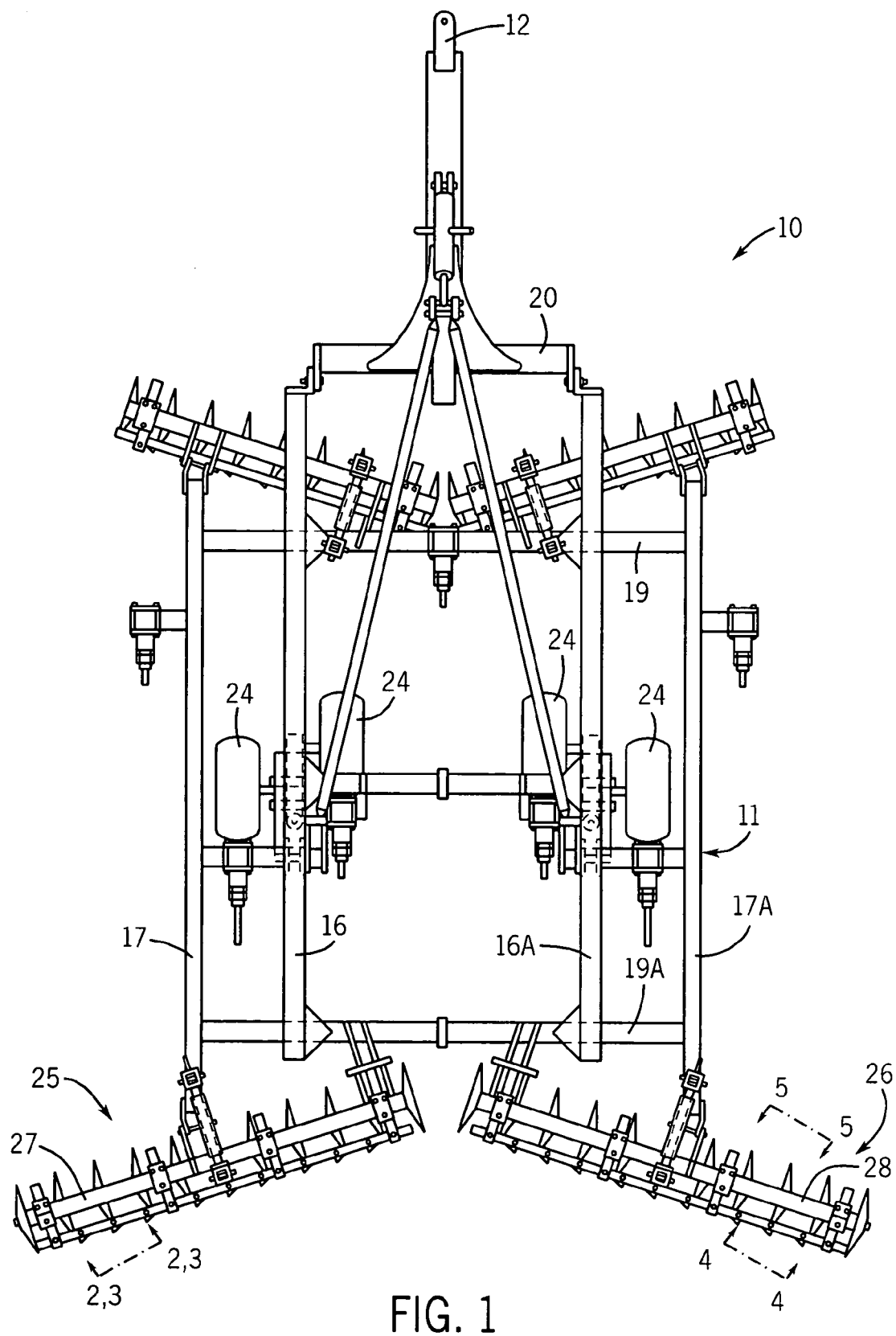
FIG. 1 is a top plan view of a known tillage device.

The present invention is directed to a disk blade scraper. However, in order to provide background for the present invention, reference will first be made to FIG. 1. In FIG. 1, there is shown an example tillage implement 10 in which the disk blade scraper of the present invention may be employed. It should be appreciated that the disk blade scraper of the present invention may be employed in any tillage implement having disk blades and that the tillage implement 10 of FIG. 1 is merely described to provide context for the present invention. The tillage implement 10 includes a rigid main frame generally designated 11 that is adapted to be attached at its front to the rear of an agricultural tractor by means of a conventional hitch 12. The main frame 11 includes first and second elongated inside frame members 16, 16A and first and second outside frame members 17, 17A. These inside and outside frame members are affixed to front and rear transverse support members 19, 19A. A third transverse support member 20 is interconnected to the forward ends of inside frame members 16, 16A. Frame 11 is supported for movement across a field or along a road by wheels 24.

As seen in FIG. 1, there are two disk blade gangs 25, 26 at the rear end of the implement. Rigid front gang tubes 27, 28 are connected to the frame 11. In the disk blade gangs 25, 26, disk blades are mounted on an elongated horizontal shaft, bolted at each end, and separated by hub spools in known manner. The disk blades can cut and mix soil and residue, or level the soil.

Figure 2:
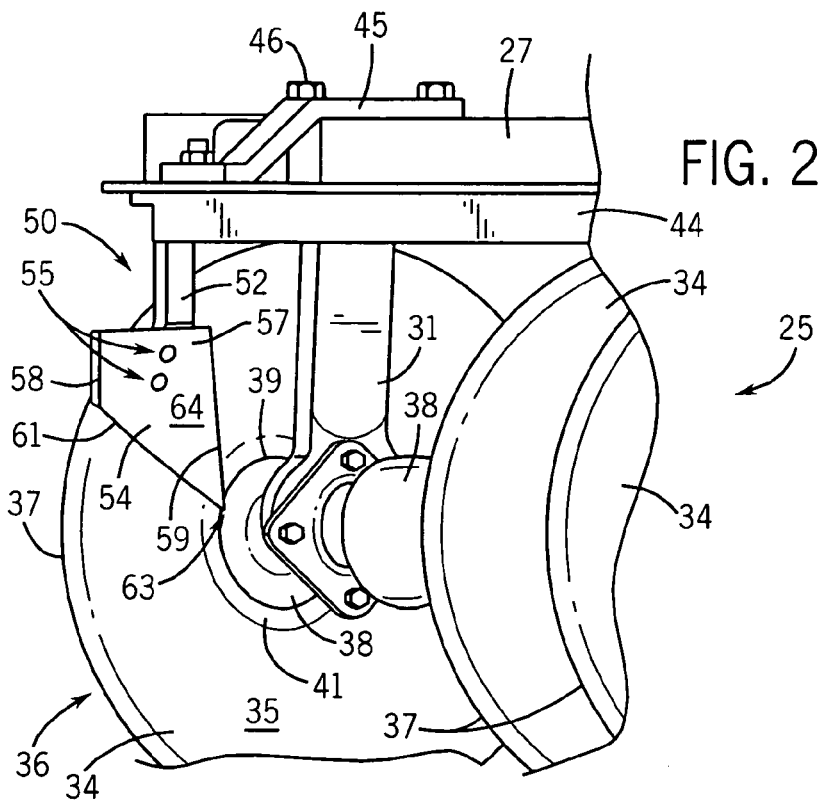
FIG. 2 is an upper right rear perspective view of a blade disk assembly including a disk blade scraper according to a first embodiment of the invention.

Turning now to FIG. 2, there is shown a portion of disk blade gang 25 (which is shown generally in FIG. 1). The disk blade gang 25 includes a first embodiment of a disk blade scraper 50 according to the present invention. The disk blade gang 25 includes horizontal gang tube 27 from which is suspended hanger 31. Hanger 31 supports a rotatable horizontal shaft (not shown) in a known manner. Disk blades 34 are laterally spaced on the horizontal shaft. The disk blades 34 include a concave surface 35, an opposite convex surface 36 and a cutting edge 37 for cutting and mixing soil when the tillage implement 10 is pulled through a field. Adjacent disk blades 34 are laterally spaced on the horizontal shaft by way of hub spools 38 in a known manner. The hub spools 38 form a circular transition joint 39 with the concave surface 35 on one disk blade 34 and another circular transition joint with the convex surface 36 of the adjacent disk blade. In an optional form of the disk blades 34, there is provided an annular depression 41 that is formed in a circular region of the concave surface 35 surrounding the transition joint 39. The disk blades 34 are typically formed of hardened steel as is well known in the art.

Still referring to FIG. 2, a blade scraper mounting frame 44 is connected rearwardly of the gang tube 27 by way of mounting element 45 and associated fasteners 46, such as nuts and bolts. In the first embodiment of the blade scraper as shown in FIG. 2, the blade scraper 50 includes a bracket 52 connected to the blade scraper mounting frame 44, and a separate integral (one piece) scraper blade 54 mounted to the bracket 52 by suitable fasteners 55 (for example, rivets, screws, bolts, spot welds or any other suitable fastening means). The scraper blade 54 is typically formed from hardened steel.

The scraper blade 54 has a first end 57 adjacent the bracket 52, a first side 58 and a second opposed side 59 extending downwardly from the first end 57. The first side 58 is shorter than the second side 59 in the embodiment shown. A scraping end 61 extends between the first side 58 and the second side 59, and the scraping end 61 and the second side 59 of the scraper blade 54 meet at a junction point 63. The scraper blade 54 has a thickness in a direction normal to an outer surface 64 of the scraper 54 blade not exceeding a cross-sectional thickness of the first end 57 in the direction normal to an outer surface 64. When the bracket 52 is connected to the blade scraper mounting frame 44 and the scraper blade 54 is mounted to the bracket 52, the first side 57 of the scraper blade 54 is further from the hub spool 38 than the second side 59 of the scraper blade 54, and the junction point 63 is adjacent the transition joint 39 between the hub spool 38 and the concave surface 35 of the disk blade 34. When the tillage implement 10 is pulled through a field, the concave surface 35 of the disk blade 34 is kept clean from the hub spool 38 on out to the cutting edge 37 of the disk blade 34 by way of the scraper blade 54.

The scraper blade 54 may be positioned in various relationships with respect to the transition joint 39 between the hub spool 38 and the concave surface 35 of the disk blade 34. The junction point 63 of the scraper blade 54 may be located within the annular depression 41 that is formed in a circular region of the concave surface 35 surrounding the transition joint 39. The junction point 63 of the scraper blade 54 may contact the transition joint 39. The junction point 63 of the scraper blade 54 may be 0.4 inches or less from the transition joint 39. The junction point 63 of the scraper blade 54 may be 0.03 to 0.13 inches from the transition joint 39.

The scraping end 61 of the scraper blade 54 may have a curved edge contoured in a complementary fashion with the concave surface 35 of the disk blade 34. The scraping end 61 of the scraper blade 54 may be positioned in various relationships with respect to the concave surface 35 of the disk blade 34. The scraping end 61 of the scraper blade 54 may contact the concave surface 35 of the disk blade 34. The scraping end 61 of the scraper blade 54 may be 0.4 inches or less from the concave surface 35 of the disk blade 34. The scraping end 61 of the scraper blade 54 may be 0.03 to 0.13 inches from the concave surface 35 of the disk blade 34. Thus, the blade scraper 50 of FIG. 2 provides a blade scraper design with a wider and tapered scraper toward the transition of the hub spool and the disk blade and the scraper point positioned very close to this transition joint.

Figure 3:
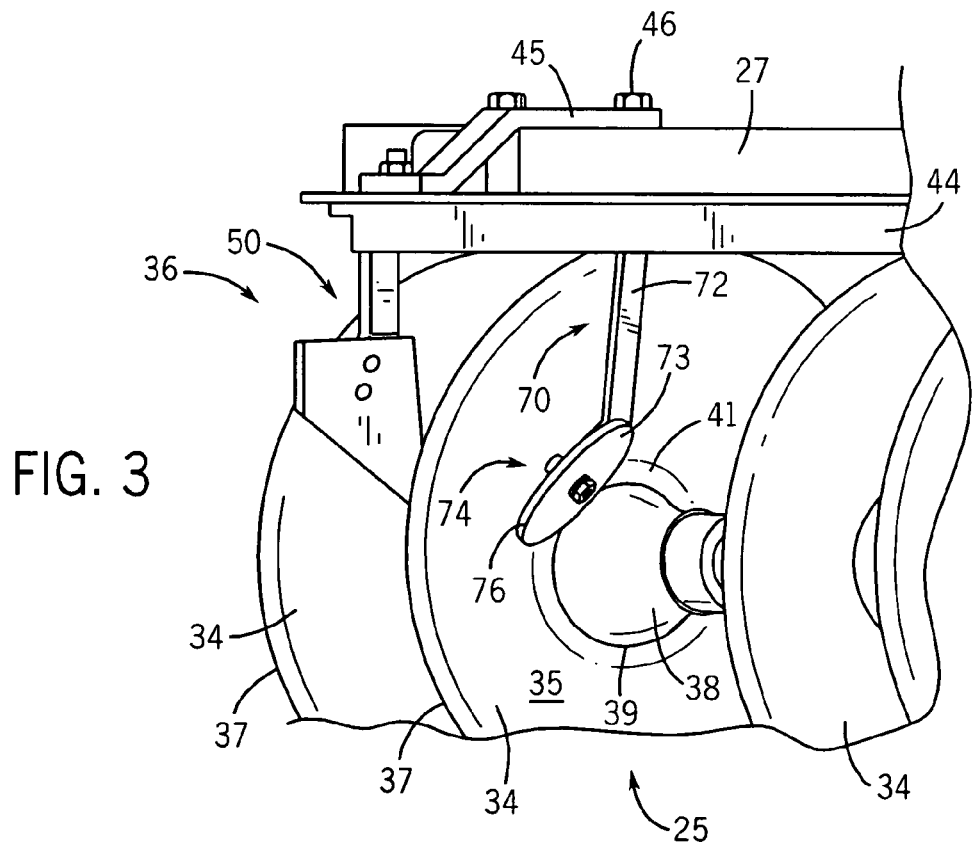
FIG. 3 is an upper right rear perspective view of a blade disk assembly including a disk blade scraper according to a second embodiment of the invention.

Turning now to FIG. 3, there is shown a portion of an alternative disk blade gang 25 (which is shown generally in FIG. 1). The disk blade gang 25 of FIG. 3 includes a second embodiment of a disk blade scraper 70 according to the present invention. (FIG. 3 also shows the first embodiment of a disk blade scraper 50 according to the present invention mounted to the blade scraper mounting frame 44 in order to illustrate that any combination of the disk blade scrapers of the present invention may be used in s disk blade assembly.) FIG. 3 shows the horizontal gang tube 27, disk blades 34, the hub spools 38, the circular transition joint 39, the annular depression 41, the blade scraper mounting frame 44, the mounting element 45 and associated fasteners 46 as shown in FIG. 2; therefore, reference can be made to the description of FIG. 2 for an explanation of these elements.

The blade scraper 70 of FIG. 3 includes a bracket 72 connected to the blade scraper mounting frame 44, and a separate integral (one piece) flat scraper blade 73 mounted to the bracket 72 by suitable fasteners 74 (for example, rivets or bolts, or any other suitable fastening means). The scraper blade 73 is in the form of a rotating disk having an axis of rotation (typically the same as the longitudinal axis of the fasteners 74) and a circumferential edge 76 parallel to the axis of rotation. The rotating disk 73 is typically formed from hardened steel.

When the bracket 72 is connected to the blade scraper mounting frame 44 and the rotating disk 73 is mounted to the bracket 72, the circumferential edge 76 of the rotating disk 73 is adjacent the transition joint 39 between the hub spool 38 and the concave surface 35 of the disk blade. An uppermost edge of the rotating disk 73 does not extend above an uppermost edge of the disk blade 34. Also, an outermost edge of the rotating disk 73 does not extend beyond an outermost edge of the disk blade 34. This arrangement improves cleaning performance. When the tillage implement 10 is pulled through a field, the concave surface 35 of the disk blade 34 is kept clean from the hub spool 38 on out to the cutting edge 37 of the disk blade 34 by way of rotation of the rotating disk 73.

The rotating disk 73 may be positioned in various relationships with respect to the transition joint 39 between the hub spool 38 and the concave surface 35 of the disk blade 34. The circumferential edge 76 of the rotating disk 73 may be located within the annular depression 41 that is formed in a circular region of the concave surface 35 surrounding the transition joint 39. The circumferential edge 76 of the rotating disk 73 may contact the transition joint 39. The circumferential edge 76 of the rotating disk 73 may be 0.4 inches or less from the transition joint 39. The circumferential edge 76 of the rotating disk 73 may be 0.03 to 0.13 inches from the transition joint 39. Thus, the blade scraper 70 of FIG. 3 provides a design incorporating a round disk cleaner. This disk cleaner is affixed to the bracket and positioned from the gang tube in such a way as to run the edge of this disk cleaner in the transition joint of the disk blade and the hub spool. The round disk cleaner rotates as disk gang turns and thus becomes self cleaning.

Figure 4:
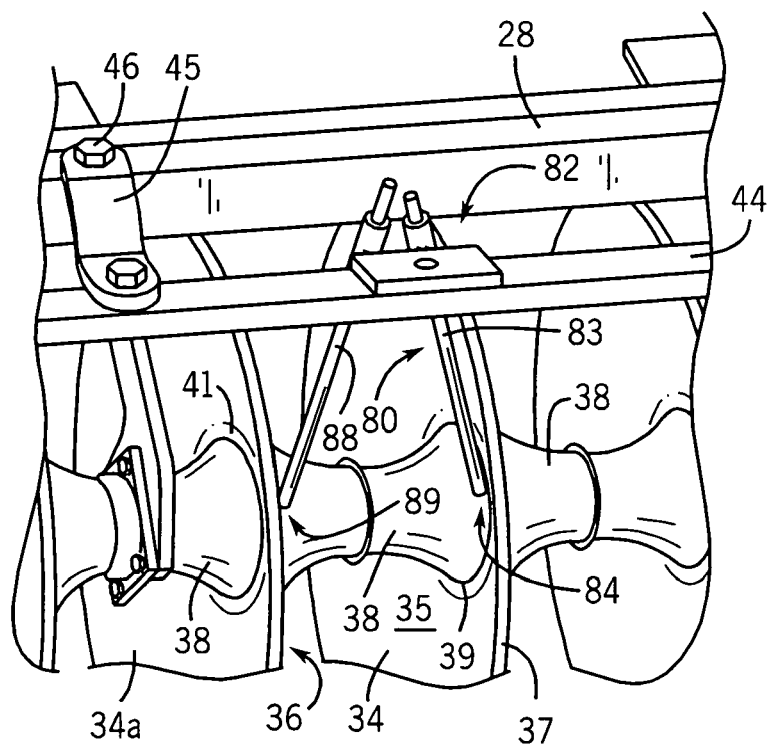
FIG. 4 is an upper left rear perspective view of a blade disk assembly including a disk blade scraper according to a third embodiment of the invention.

Turning now to FIG. 4, there is shown a portion of a disk blade gang 26 (which is shown generally in FIG. 1). The disk blade gang 26 of FIG. 4 includes a third embodiment of a disk blade scraper 80 according to the present invention. FIG. 4 shows a horizontal gang tube 28, disk blades 34, hub spools 38, the circular transition joint 39, the annular depression 41, the blade scraper mounting frame 44, the mounting element 45 and associated fasteners 46 as in FIG. 2; therefore, reference can be made to the description of FIG. 2 for an explanation of these elements.

The blade scraper 80 of FIG. 4 includes a bracket 82 connected to the blade scraper mounting frame 44, and a first separate integral (one piece) elongated bar 83 and a second separate integral (one piece) elongated bar 88 mounted to the bracket 82 by suitable fasteners. The elongated bars 83, 88 are shown in the form of elongated cylindrical rods. However, the bars 83, 88 may have various cross-sectional shapes including, without limitation, a circular cross-section (as shown) and a square cross-section. The bars 83, 88 each have a longitudinal axis, and the bars 83, 88 each have a scraping surface 84, 89 respectively at an end of the bar farthest from the bracket 82. The scraping surfaces 84, 89 of the bars 83, 88 have at least a portion at an angle with respect to the longitudinal axis of the bar. In one configuration, the scraping surface is a flat surface perpendicular to the longitudinal axis of the bar. In another configuration, the scraping surface is a domed surface. The elongated bars 83, 88 are typically formed from hardened steel.

When the bracket 82 is connected to the blade scraper mounting frame 44 and each bar 83, 88 is mounted to the bracket 82, the scraping surface 84 of the bar 83 is adjacent the transition joint 39 between the hub spool 38 and the concave surface 35 of the disk blade 34, and the scraping surface 89 of the bar 88 is adjacent the transition joint 39 between the hub spool 38 and the convex surface 36 of the disk blade 34a. Also, when the bracket 82 is connected to the blade scraper mounting frame 44 and each bar 83, 88 is mounted to the bracket 82, and an imaginary straight line including the longitudinal axis of each bar 83, 88 intersects the hub spool 38 if the imaginary straight line is extended beyond the end of the bar 83, 88. This arrangement improves cleaning performance. When the tillage implement 10 is pulled through a field, the concave surface 35 of the disk blade 34 and the convex surface 36 of the disk blade 34a are kept clean from the hub spool 38 on out to the cutting edge 37 of the disk blade by way of bars 83, 88.

The bars 83, 88 may be positioned in various relationships with respect to the transition joint 39 between the hub spool 38 and the concave surface 35 of the disk blade 34 and the convex surface 36 of the disk blade 34a. The scraping surface 84 of the bar 83 may be located within the annular depression 41 that is formed in a circular region of the concave surface 35 surrounding the transition joint 39. The scraping surface 84 of the bar 83 and the scraping surface 89 of the bar 88 may contact the transition joint 39. The scraping surface 84 of the bar 83 and the scraping surface 89 of the bar 88 may be 0.4 inches or less from the transition joint 39. The scraping surface 84 of the bar 83 and the scraping surface 89 of the bar 88 may be 0.03 to 0.13 inches from the transition joint 39. Thus, the blade scraper 80 of FIG. 4 provides a design incorporating a round and or square bar shank. These bars are affixed to the bracket from the gang tube on either the front or backside or both sides of the disk blade. These rods are positioned in such a way that the rod ends are perpendicular to the hub spool center line and disk blade transition joint and the rod ends rub against this transition joint.

Figure 5:
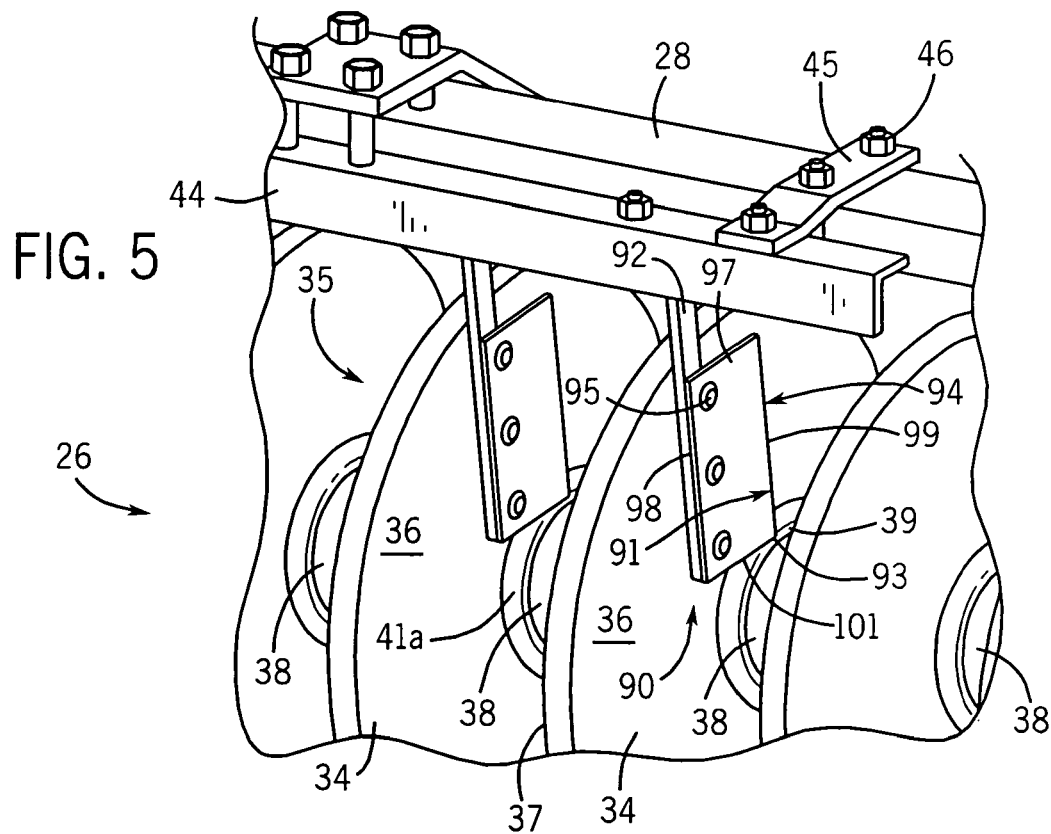
FIG. 5 is an upper left front perspective view of a blade disk assembly including a disk blade scraper according to a fourth embodiment of the invention.

Turning now to FIG. 5, there is shown a portion of disk blade gang 26 (which is shown generally in FIG. 1). The disk blade gang 26 includes a fourth embodiment of a disk blade scraper 90 according to the present invention. FIG. 5 shows a horizontal gang tube 28, disk blades 34, hub spools 38, the circular transition joint 39, the blade scraper mounting frame 44, the mounting element 45 and associated fasteners 46 as in FIG. 2; therefore, reference can be made to the description of FIG. 2 for an explanation of these elements. In FIG. 4, the blade scraper mounting frame 44 is mounted forwardly of the gang tube 28.

The fourth embodiment of the blade scraper 90 includes a bracket 92 connected to the blade scraper mounting frame 44, and a separate integral rectangular (one piece) scraper blade 94 mounted to the bracket 92 by suitable fasteners 95 (for example, rivets, screws, bolts, spot welds or any other suitable fastening means). The scraper blade 94 is typically formed from hardened steel.

The scraper blade 94 has a first end 97 adjacent the bracket 92, a first side 98 and a second opposed side 99 extending downwardly from the first end 97. The first side 98 is approximately equal in length to the second side 99 in the embodiment shown. A scraping surface 91 is provided at the second side 99, and a bottom end 101 and the second side 99 of the scraper blade 94 meet at a junction point 93. When the bracket 92 is connected to the blade scraper mounting frame 44 and the scraper blade 94 is mounted to the bracket 92, all of the scraper blade 94 is positioned above the hub spool 38, the scraping surface 91 is positioned in contact with the convex surface 36 of the disk blade 34, and the junction point 93 is adjacent the transition joint 39 between the hub spool 38 and the convex surface 36 of the disk blade 34. When the tillage implement 10 is pulled through a field, the convex surface 36 of the disk blade 34 is kept clean from the hub spool 38 on out to the cutting edge 37 of the disk blade 34 by way of the scraper blade 94.

The scraper blade 94 may be positioned in various relationships with respect to the hub spool 38. The scraper blade 94 may be positioned on both sides of a vertical normal line to a center axis of the hub spool 38. The scraping surface 91 may be positioned behind the center axis of the hub spool 38 in relation to a direction of movement of the tillage implement 10.

The scraper blade 94 may be positioned in various relationships with respect to the transition joint 39 between the hub spool 38 and the convex surface 36 of the disk blade 34. The junction point 93 of the scraper blade 94 may be located adjacent an annular crimped raised area 41a that is formed in a circular region of the concave surface 35 surrounding the transition joint 39. The junction point 93 of the scraper blade 94 may contact the transition joint 39. The junction point 93 of the scraper blade 94 may be 0.4 inches or less from the transition joint 39. The junction point 93 of the scraper blade 94 may be 0.03 to 0.13 inches from the transition joint 39.

The scraping surface 91 of the scraper blade 94 may be positioned in various relationships with respect to the convex surface 36 of the disk blade 34. The scraping surface 91 of the scraper blade 94 may contact the convex surface 36 of the disk blade 34. The scraping surface 91 of the scraper blade 94 may be 0.4 inches or less from the convex surface 36 of the disk blade 34. The scraping surface 91 of the scraper blade 94 may be 0.03 to 0.13 inches from the convex surface 36 of the disk blade 34. Thus, the blade scraper 90 of FIG. 5 provides a design incorporating a flat scraper blade shaped to fit the contour of the convex backside of the disk blade and clean this side. These backside disk blade scrapers are affixed to the bracket from the gang tube from the front side of the gang tube. This backside disk scraper is positioned vertically and contacts the disk blade behind the hub spool centerline. The corner of this scraper is positioned very close to the transition joint of the disk blade and the hub spool.

Figure 6:
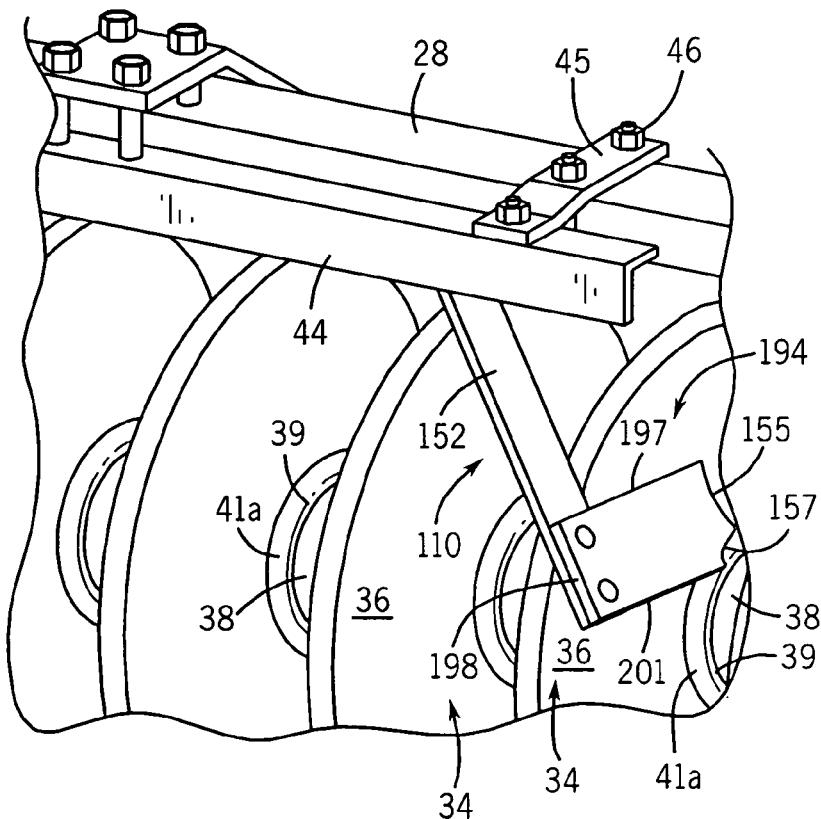
FIG. 6 is an upper left front perspective view of a blade disk assembly including a disk blade scraper according to a fifth embodiment of the invention.
Figure 6A:
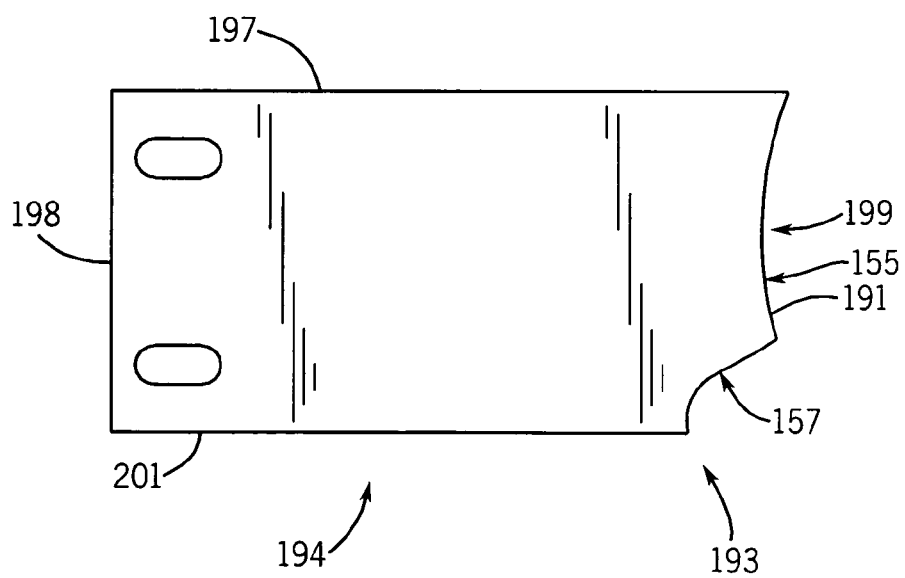
FIG. 6A is a top view of the scraper blade of the fifth embodiment of the invention.

Turning now to FIGS. 6 and 6A, there is shown a fifth embodiment of a disk blade scraper 110 according to the present invention. The fifth embodiment of the invention is similar to the fourth embodiment of the blade scraper 90 shown in FIG. 5 albeit with a different scraper blade. In the disk blade scraper of FIGS. 6 and 6A, the scraper blade 194 has a first end 197 adjacent the bracket 152, a first side 198 and a second opposed side 199 extending downwardly from the first end 197. The first side 198 of the scraper blade 194 is shorter in length compared to the first side 98 in the embodiment of FIG. 5. A scraping surface 191 is provided at the second side 199 of the scraper blade 194, and a bottom end 201 and the second side 199 of the scraper blade 194 meet at a junction point 193. In the disk blade scraper 110 of FIGS. 6 and 6A, the scraping surface 191 has an inwardly curved edge 155 that may be a radius and that contacts the convex surface 36 of the disk blade 34. Also, the scraping surface 191 has a second inwardly curved edge 157 that may be a radius and that contacts the crimp 41a on the convex surface 36 of the disk blade 36. The edges 155, 157 provide for improved cleaning performance. The scraper blade 94 of FIG. 5 may also include an inwardly curved edge and a second inwardly curved edge as in the blade scraper 194 of FIGS. 6 and 6A.

Therefore, the present invention provides a disk blade scraper that provides superior blade cleaning capabilities during field tillage operation in any type of soil conditions. The disk blade scraper keeps the disk blade and hub spool area from building up with dirt/residue such that the disk blade is kept clean from the disk blade and hub spool area on out to the cutting edge of the disk blade.

Although the present invention has been described in detail with reference to certain embodiments, one skilled in the art will appreciate that the present invention can be practiced by other than the described embodiments, which have been presented for purposes of illustration and not of limitation. For example, any number of the same disk blade scrapers or combination of different disk blade scrapers can be used with each disk blade gang. Therefore, the scope of the appended claims should not be limited to the description of the embodiments contained herein.

What is claimed is:

1. A disk blade scraper for a tillage implement having a frame, a horizontal shaft suspended from the frame, a plurality of rotating disk blades arranged in laterally spaced relationship on the shaft, a hub spool surrounding the shaft between at least a pair of adjacent disk blades wherein a first end of the hub spool contacts one of the pair of adjacent disk blades thereby creating a transition joint between the first end of the hub spool and a surface of the one of the pair of adjacent disk blades, the scraper comprising:

a bracket having an upper portion connected to the frame and a lower portion at an obtuse angle to the upper portion, the upper portion of the bracket lying in a plane that intersects the shaft and the frame; and a rotating disk mounted to the lower portion of the bracket, the rotating disk having an axis of rotation perpendicular to the lower portion of the bracket and a circumferential edge, wherein the rotating disk is mounted to a lower end of the lower portion of the bracket such that the circumferential edge of the rotating disk is adjacent the transition joint and such that the lower end of the lower portion of the bracket is between the rotating disk and the one of the pair of adjacent disk blades, wherein the surface of the one of the pair of adjacent disk blades is concave-shaped, wherein the one of the pair of adjacent disk blades includes an annular depression relative to the concave surface, the annular depression surrounding the transition joint, wherein the circumferential edge of the rotating disk is located within the annular depression, wherein the concave-shaped surface defines a cavity, and wherein the rotating disk is received entirely with the cavity.

2. The scraper of claim 1 wherein:

the circumferential edge of the rotating disk contacts the transition joint.

3. The scraper of claim 1 wherein;

an uppermost edge of the rotating disk is 0.4 inches or less from the transition joint.

4. The scraper of claim 1 wherein:

the circumferential edge of the rotating disk is 0.4 inches or less from the transition joint.

5. The scraper of claim 1 wherein:

the circumferential edge of the rotating disk is 0.03 to 0.13 inches from the transition joint.

6. The scraper of claim 1 wherein:

an outermost edge of the rotating disk does not extend beyond an outermost edge of an adjacent disk blade.

* * * * *